(No Model.)

W. B. NULL.
HAY DRAG.

No. 359,462. Patented Mar. 15, 1887.

WITNESSES:
Fred G. Dieterich
Solon C. Kemon

INVENTOR:
Wm B. Null
BY Munn & Co
ATTORNEYS.

UNITED STATES PATENT OFFICE.

WILLIAM BAKER NULL, OF EVANSVILLE, MISSOURI.

HAY-DRAG.

SPECIFICATION forming part of Letters Patent No. 359,462, dated March 15, 1887.

Application filed November 5, 1886. Serial No. 218,102. (No model.)

*To all whom it may concern:*

Be it known that I, WILLIAM BAKER NULL, a citizen of the United States, residing at Evansville, in the county of Monroe and State of Missouri, have invented certain new and useful Improvements in Hay-Drags, of which the following is a specification, reference being had to the accompanying drawings, forming part thereof, in which—

Figure 1:
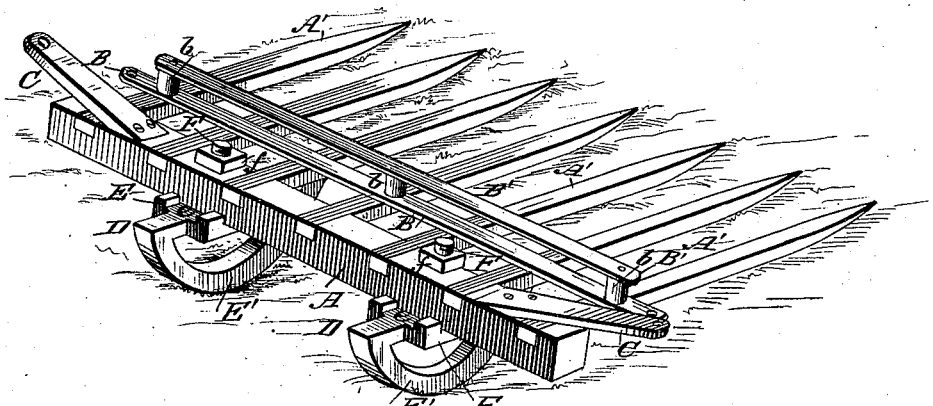
Figure 2:
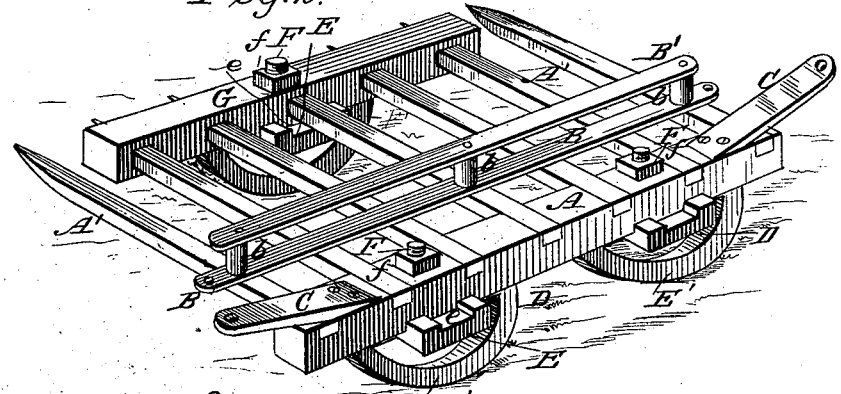
Figure 3:
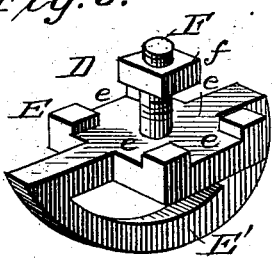
Figure 4:
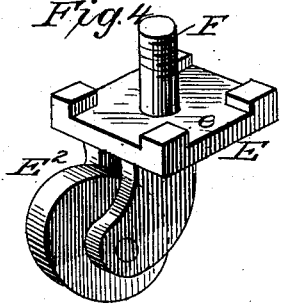

Figure 1 is a perspective view of my improved drag, the runners being in the position required when the drag is in use for conveying hay. Fig. 2 is a similar view, the runners being parallel with the main beam, a supplemental runner being provided, so that the drag-teeth will be raised. The drag with its runners thus positioned is ready for being transported from one place to another and may easily pass through gates. Fig. 3 is a perspective view of one of the reversible runners removed, and Fig. 4 is a perspective view of a modification.

My invention consists in a hay-drag provided on its main beam with runners, wheels, or supports, and a supplemental runner, wheel, or support for the outer ends of the drag-teeth.

A represents the main beam of the drag, provided with the teeth A'. To the teeth, parallel with the main beam and in advance thereof, are secured the bars B B', which form stops to prevent the hay from sliding backward and off the drag. The bars B B' are separated by short vertical posts b. The ends of the lower bar, B, project beyond the teeth and are each provided with an aperture to receive the bolt of a clevis or draft attachment, for use when the drag is being moved from place to place—that is, when the runners are in the position shown in Fig. 2.

To opposite ends of the main beam the draft attachments C C are secured. These draft attachments are to be used when the drag is in use or when its three runners are at right angles to the main beam. To the under side of the main beam are secured the reversible supports D. These supports each consist, preferably, of an attaching-plate, E, having a cruciform recess, e, in its upper face, and a runner E', or a wheel, E², secured to its under face. The plates E may be connected in any suitable manner to the main beam A; but I prefer to use bolts F, which pass through the plates and beams and are held in place by nuts f.

When it is desired to transport the drag from one place to another and through gates, the supporting devices are turned from the position shown in Fig. 1 to that shown in Fig. 2, and the supplemental support is attached to the drag-teeth with its runner or wheel, as the case may be, parallel with the runners or wheels on the main-beam supports.

The supplemental support consists of a bar, G, apertured transversely to receive the drag-teeth A', and an attaching-plate, E, having a cruciform recess, e, a runner, E', and bolt and nut F f, just as in the main-beam supports.

If there are no gates to pass through the main-beam supports D are not reversed, but are left as in Fig. 1, and the runner or wheel on the supplemental support is turned at right angles to the position it occupies in Fig. 2. This is accomplished by loosening the nut f and giving the plate E and runner a quarter-turn, to bring the other arm of the recess into position to receive the lower edge of the bar G, and then tightening the nut.

It is evident that the runners and attaching-plates forming the supports may be cast integral or formed separately of any suitable material.

Having now described my invention, what I claim as new, and desire to secure by Letters Patent, is—

1. The combination, with a hay-drag having a main beam and teeth, of supports on the under side of the main bar thereof and a supplemental support connected with the outer ends of the drag-teeth parallel with the supports on the main bar, substantially as set forth.

2. The combination of the main bar and teeth of a hay-drag with the reversible supports on the under side of the main bar and a reversible supplemental support for the forward or outer ends of the teeth, substantially as set forth.

3. The combination, in a hay-drag, with the main bar and the teeth, of the supports provided with attaching-plates having cruciform recesses in their upper faces to receive the lower edge of the main beam, and a supplemental support for the outer ends of the teeth, also provided with a reversible attaching-plate, substantially as set forth.

4. In a hay-drag, the support consisting in an attaching-plate having a cruciform recess in its upper surface and a runner secured to or formed on its lower face, substantially as set forth.

5. In a hay-drag, the supplemental support consisting of a bar having transverse tooth-receiving apertures, an attaching-plate having a cruciform recess on its upper face, a runner secured to or formed on its under face, and the bolt and nut connecting said plate and bar, substantially as set forth.

WILLIAM BAKER NULL.

Witnesses:
WILLIAM OAK,
W. T. McCANNE.